UNITED STATES PATENT OFFICE.

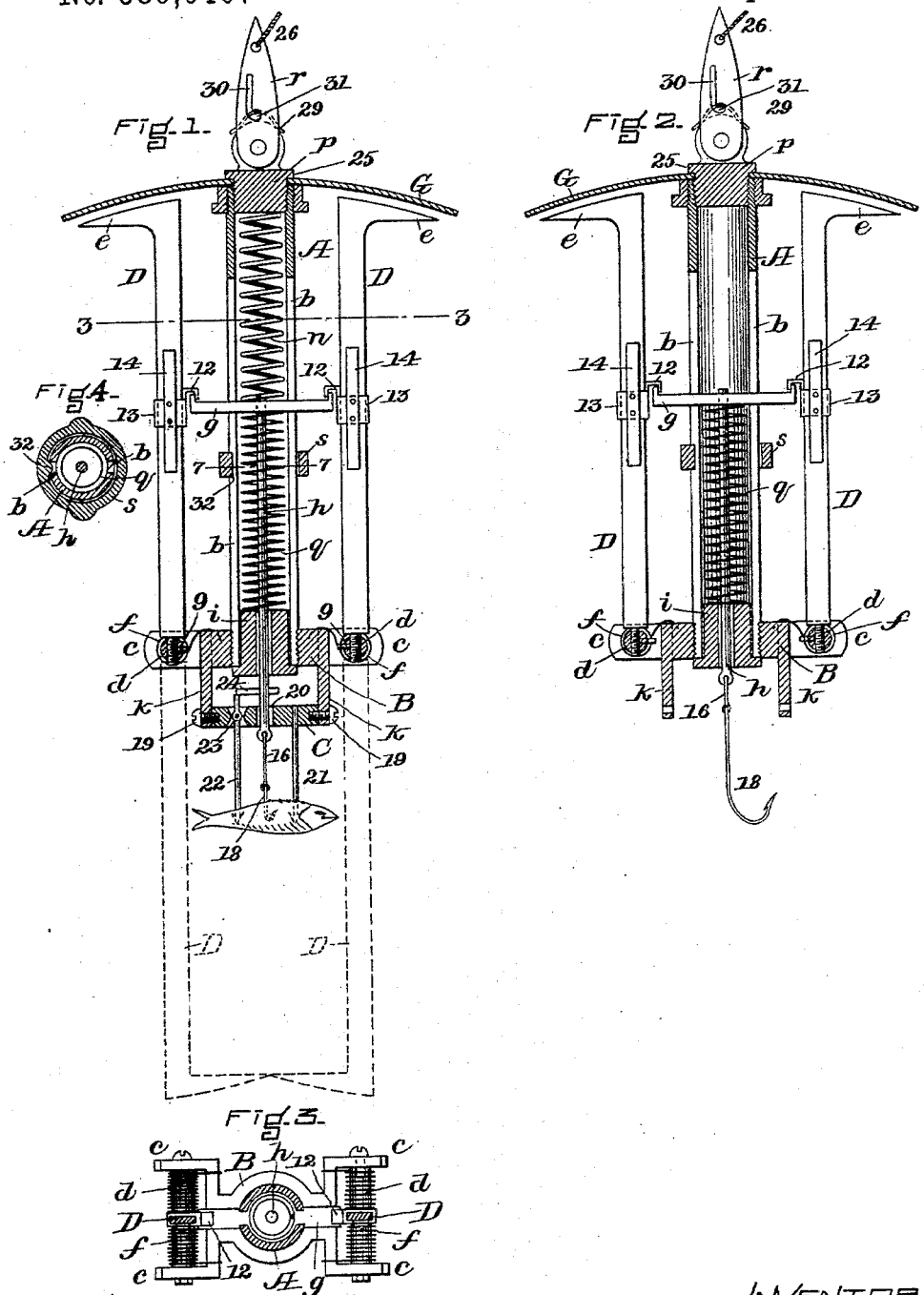

JACOB CARTIER, OF BIDDEFORD, MAINE.

COMBINED FISH AND ANIMAL TRAP.

SPECIFICATION forming part of Letters Patent No. 589,640, dated September 7, 1897.

Application filed December 18, 1896. Serial No. 616,203. (No model.)

*To all whom it may concern:*

Be it known that I, JACOB CARTIER, a citizen of the United States, residing at Biddeford, in the county of York and State of Maine, have invented certain new and useful Improvements in a Combined Fish and Animal Trap, of which the following is a full, clear, and exact description, reference being had to the accompanying drawings, making part of this specification, in which—

Figure 1 is a vertical section of a fish and animal trap constructed in accordance with my invention, the bait-holding device being adapted for large fish and animals. Fig. 2 is a similar section with some of the parts removed to adapt the trap for catching small fish by a direct pull on the bait-holding hook. Fig. 3 is a horizontal section on the line 3 3 of Fig. 1. Fig. 4 is a horizontal section on the line 7 7 of Fig 1.

My invention relates to a combined fish and animal trap of simple construction which is adapted for catching large or small fish, and also for trapping animals on land; and to this end my invention consists in certain novel features and combinations of parts, as will be hereinafter fully described, and pointed out in the claims.

In the said drawings, A represents the body or main portion of the trap, which consists of a tubular casing provided on opposite sides with longitudinal slots $b\ b$. To the bottom of the casing A is secured a yoke or piece B, having on each side a pair of lugs $c\ c$, between which is pivoted the hub $d$ of an arm or lever D, the latter being provided at its upper or free end with a short hook or barb $e$. Around the hub $d$ is coiled a spring $f$, one end of which is secured to the yoke and the other end to a screw 9, projecting from the hub $d$, into which the end of the arm D is screwed, whereby as the arm is raised into the position shown in Fig. 1 the spring $f$ will be wound up or tightened to swing the arm D downward when released. Each of the spring-actuated arms D is provided with a sliding hook-shaped catch 12, these catches being engaged by the upturned ends of a tripping-bar $g$, which extends transversely across the interior of the casing A and through the slots $b$, in which it slides up and down. The catches 12 are each provided with a sleeve 13, fitted to slide upon the arm D, a flat spring 14, secured to the sleeve 13 and bearing on the arm D, producing sufficient friction to hold the catch in place after it has been adjusted to engage the bar $g$, so that it will not slide upon the arm D when the tripping-bar $g$ is drawn down, as hereinafter described, to spring the trap.

The tripping-bar $g$ is secured to the upper end of a rod $h$, which extends down through a removable plug $i$, tightly fitted, preferably with a rubber packing, into the open lower end of the casing A; the bottom of the rod $h$ being preferably provided with an eye for the attachment of a short bait-line 16, provided with a fish-hook 18.

$k\ k$ are two hangers depending from the yoke B and provided with screws 19, between which is removably secured a cross-bar C, having a central aperture 20 for the passage of the end of the rod $h$. To the cross-bar C are secured two straight bait-holding rods 21 22, the rod 21 being rigidly fastened to the upper end of the cross-bar C, while the rod 22 is pivoted thereto at 23, its shorter upper arm extending above the cross-bar and catching under the end of a laterally-extending pin or projection 24, secured to the vertical rod $h$, whereby said rod $h$, together with the tripping-bar $g$, attached thereto, is held up against the resistance of the strong spiral spring $n$, located within the casing A between the tripping-bar $g$ and the screw-plug $p$, which closes the top of said casing, the parts being then in the position shown in Fig. 1 and the trap being set. When the fish or animal seizes the bait on the rods 21 22 and bites it, the rod 21 acts as a brace, while the rod 22 is swung inward on its pivot, thereby withdrawing its upper end from under the pin 24 and releasing the rod $h$, when the spring $n$ will instantly force down the tripping-bar $g$ and release the arms D, engaged therewith, which will then be swung down in the arc of a circle by their springs into the position shown by dotted lines in Fig. 1, the hooks or barbs $e$ entering the fish or animal and coöperating with the barbs at the ends of the bait-holding rods 21 22 to catch and hold the fish or animal, as desired. Beneath the tripping-bar $g$ is a light coiled spring $q$, which acts as a buffer when said bar is forced down by the stronger spring $n$ and prevents it from being thrown down into contact with the plug $i$.

The screw-plug $p$ is provided with a flange 25, between which and the top of the casing A is secured a curved guard-plate G, which extends over the hooked ends $e$ of the spring-actuated arms D and thereby prevents them from catching in seaweed or other substances which would interfere with their free movement when released. To the plug $p$ is pivoted a long sharp-pointed plate $r$, to which is fastened the line 26, by which the trap is lowered into the water. This pointed plate $r$ may be driven into a tree or other object when the trap is to be used on land and it is desired to suspend the trap above the ground. The plate $r$ is provided with a friction device for holding it firmly when turned at an angle, said device consisting of a spring 29, placed within a slot 30, having a notch 31, the spring when in the notch exerting a pressure on the top of the plug $p$ and preventing the trap from swinging to one side or the other.

When it is desired to use the trap for small fish, the cross-bar C, together with the bait-rods 21 22, secured thereto, and the stiff spring $n$, are removed, as shown in Fig. 2, the lighter spring $q$ beneath the tripping-bar being retained to hold said bar up in engagement with the catches 12 of the arms D, and when the fish seizes the bait on the hook 18 and exerts a downward pull on the same the tripping-bar $g$ will be drawn down against the resistance of the light spring $q$, when the trap will be sprung and the arms D brought down by their springs to catch the fish, as previously described.

To lock the trap when set, so that bait can be put on or taken off without danger of injury to the hands by the accidental springing of the trap, I provide a safety-ring $s$, which loosely encircles the casing A and can be slid up under the tripping-bar $g$ to prevent the same from being drawn down to release the arms D. This ring $s$ is provided with an inner rounded projection 32, which enters one of the slots $b$, and by slightly turning the ring $s$ upon the casing the projection 32 will be forced out of the slot $b$ onto the outer surface of the casing, thus binding the ring $s$ firmly in place under the bar $g$ to lock the same, as desired.

If desired, the arms D may be provided with means for attaching thereto a pair of small dip-nets, which when the trap is sprung will be brought together to inclose a school of small fishes, which can be seen from the surface of the water, in which case a small line will be so arranged that it can be pulled at the proper time to release the tripping-bar $g$ by the person holding the main line, to which the trap is attached.

It will be seen that a trap constructed as above described is capable, by making the changes referred to, of being used on land or in the water for catching or trapping a great variety of animals or fishes and is, moreover, simple, very durable, and easily handled without liability of getting out of order.

What I claim as my invention, and desire to secure by Letters Patent, is—

1. A fish and animal trap, comprising a tubular casing provided on each side with a longitudinal slot, spring-actuated arms or levers pivoted at the bottom of the casing and provided with hooks at their outer ends, said arms being adapted to be swung upward into parallelism or nearly so with the casing, a tripping-bar extending transversely across the interior of the casing and projecting on each side through the longitudinal slots thereof, catches on the spring-actuated arms adapted to engage the opposite ends of the tripping-bar, whereby said hooked arms are held in a raised position against the resistance of their springs when the trap is set, and a bait-holding device for operating the tripping-bar to release the spring-actuated arms, substantially as described.

2. In a fish and animal trap, the combination with a tubular casing provided on each side with a longitudinal slot, of spring-actuated arms or levers pivoted at the bottom of the casing and provided at their outer ends with hooks and adapted to be turned upward into parallelism or nearly so with the sides of the casing when the trap is set, a tripping-bar extending transversely across the interior of the casing and having its ends extended through the slots thereof and adapted to engage catches on the spring-actuated arms to hold the latter in a raised position against the resistance of their springs, when the trap is set, a spiral spring placed above the tripping-bar and acting to depress the same when released, a rod attached to the tripping-bar and extending beyond the bottom of the casing and provided with a lateral projection, and a bait-holding device consisting of a cross-bar secured to supports connected with the casing and provided with two barbed bait-rods, one rigidly secured to the cross-bar and the other pivoted thereto in such manner that its upper end will engage the lateral projection on the tripping-bar rod to hold the same against the pressure of the spring above the same, whereby when the bait is seized, the upper end of the pivoted bait-rod will be moved to release the tripping-bar and spring the trap, substantially as described.

3. In a fish and animal trap, the combination with the casing, its spring-actuated arms, the tripping-bar for holding the same in a raised position, and the bait-holding device for operating the tripping-bar to release said arms, of a curved guard-plate located at the upper end of the tubular casing and extending over the hooked upper ends of the spring-actuated arms when raised, whereby the hooks are protected and prevented from becoming entangled in weeds or the like, substantially as set forth.

4. In a fish and animal trap, the combination with the tubular casing, of the yoke B carrying the spring-actuated arms D, D, said yoke being made removable from the casing, substantially as set forth.

5. In a fish and animal trap, the combination with the slotted tubular casing and the tripping-bar, of the spring-actuated arms provided with catches adjustable thereon and adapted to engage the upturned ends of the tripping-bar, said catches having friction-springs bearing on the arms to hold them in place when adjusted, substantially as set forth.

6. In a fish and animal trap, the combination with the tubular casing A provided with longitudinal slots $b$ and having plugs fitted into its opposite ends, of the spring-actuated arms D pivoted at the bottom of the casing and provided with hooks at their free ends, the tripping-bar $g$ extending across the interior of the casing and out through the slots $b$ and engaging catches on the arms D to hold the latter in a raised position, the spiral springs $n$, $q$, placed one above and the other beneath the tripping-bar $g$, the spring $n$ being of greater strength than the spring $q$, a rod $h$ secured to the tripping-bar and provided with a pin or projection 24, and a bait-holding device consisting of a cross-bar C secured to hangers or supports $k$ and provided with bait-rods 21, 22, the rod 21 being rigidly secured to the cross-bar and the rod 22, being pivoted thereto and extending above the same to engage the projection 24 on the rod $h$ to hold the tripping-bar against the resistance of the spring $n$, all constructed to operate substantially in the manner and for the purpose set forth.

Witness my hand this 12th day of December, A. D. 1896.

JACOB CARTIER.

In presence of—
F. F. BEAUREGARD,
ISAIAH ROCHEFORT.